United States Patent
Ogawa et al.

(10) Patent No.: US 7,107,474 B2
(45) Date of Patent: Sep. 12, 2006

(54) DATA TRANSFER UNIT AND METHOD

(75) Inventors: Kazuya Ogawa, Tokyo (JP); Seiichi Emoto, Tokyo (JP)

(73) Assignee: Sony Corporation, Tokyo (JP)

( * ) Notice: Subject to any disclaimer, the term of this patent is extended or adjusted under 35 U.S.C. 154(b) by 491 days.

(21) Appl. No.: 10/660,182

(22) Filed: Sep. 11, 2003

(65) Prior Publication Data

US 2004/0130954 A1 Jul. 8, 2004

(30) Foreign Application Priority Data

Sep. 13, 2002 (JP) .............................. 2002-269047

(51) Int. Cl.
*G06F 1/04* (2006.01)
*G11C 29/00* (2006.01)

(52) U.S. Cl. ................. 713/401; 713/600; 365/189.01; 375/240.28

(58) Field of Classification Search ................ 713/401, 713/600; 375/240.28; 365/189.01
See application file for complete search history.

(56) References Cited

U.S. PATENT DOCUMENTS 5,387,825 A * 2/1995 Cantrell et al. ............... 327/26

* cited by examiner

*Primary Examiner*—Thomas Lee
*Assistant Examiner*—Hari Patel
(74) *Attorney, Agent, or Firm*—Finnegan, Henderson, Farabow, Garrett & Dunner, L.L.P.

(57) ABSTRACT

A data transfer unit (13) is provided for use in a clock swapping system which controls data transfer with a data transmission permit signal (rwo) and data reception permit signal (rro). The data transfer unit (13) includes a data latch (21) which latches transfer data in time with a transmission enable signal (ewi) and from which the data is read in time with a reception enable signal (eri), a first FR-FF circuit (31) which delays the transmission enable signal (ewi) for at least one period of a transmission clock (ckw), and a third SR-FF circuit 33 which delays the reception enable signal (eri) for a period of a reception clock (ckr). In the data transfer unit (13), a signal latched by the first SR-FF circuit (31) is latched a series of two times in time with the reception clock (ckr) to generate the reception permit signal (rro) and a signal latched by the third SR-FF circuit (33) is latched a series of two times in time with the transmission clock (ckw) to generate the transmission permit signal (rwo). Thus, the data transfer unit (13) can always assure stable data transfer by eliminating influence of a metastable state, if any.

4 Claims, 8 Drawing Sheets

DATA TRANSFER UNIT AND METHOD

BACKGROUND OF THE INVENTION

1. Field of the Invention

The present invention relates to a data transfer unit and method, which permit data transfer between two systems operating on clocks asynchronous with each other.

This application claims the priority of the Japanese Patent Application No. 2002-269047 filed on Sep. 13, 2002, the entirety of which is incorporated by reference herein.

2. Description of the Related Art

For data transfer between two systems operating on clocks asynchronous with each other, one of the systems has to use the clock for the other system while the other system has to use the clock for the one system. Conventionally, this swapping between clocks is attained by accommodating a difference in timing between the clocks in an FIFO register or RAM or by generating a new clock for synchronization and transferring data synchronously with the new clock. However, the former method needs the FIFO register or RAM, which leads to an increased scale of circuit. Also, the latter method makes it necessary to input clock ratio information, timing adjusting parameter information or the like and provide a circuit which generates a clock for synchronization timing, which also leads to an increased circuit scale.

Further, the above clock swapping is attained by detecting an enable signal for data to be sent in time with a clock for a receiving end and transfer the data in time with the enable-signal detection. This method can be accomplished with an extremely small increase of the circuit scale but it is not possible unless the clock for the receiving end is sufficiently earlier than the clock for the sending end.

To solve the above problems, there has so far been proposed a system in which a data transmission permit signal and data reception permit signal are generated and the clock swapping for data transfer is done in response to the permit signals as shown in FIG. 1. The conventional clock swapping system shown in FIG. 1 will be described below.

As shown, in the conventional clock swapping system, generally indicated with a reference 100, there is provided between a data-transmission source (will be referred to as "transmitter 101" hereunder) and a data-transmission destination (will be referred to as "receiver 102" hereunder) a data transfer unit 103 which transfers data from the transmitter 101 to the receiver 102.

The transmitter 101 operates on a clock of a predetermined frequency (transmission clock ckw). The transmitter 101 outputs data on a predetermined bus width from a data output terminal thereof. For data transfer, the transmitter 101 sends transmission data dwi to the data transfer unit 103 synchronously with the transmission clock ckw.

For the data transfer, the transmitter 101 outputs also a transmission enable signal ewi indicating a transmission timing of the transmission data dwi transferred on a bus to the data transfer unit 103 synchronously with the transmission data dwi. The transmission enable signal ewi is represented by a binary signal having either of two values: H (high) and L (low) synchronous with the transmission clock ckw. The transmission enable signal ewi takes the value H when the transmission data dwi is being transferred from the transmitter 101 to the data transfer nit 103, and the value L when the transmission data dwi is not being transferred so.

The transmitter 101 receives, from the data transfer unit 103, a transmission permit signal rwo permitting to output the transmission data dwi. The transmission permit signal rwo is represented by a binary signal having either of two values: H (high) and L (low) synchronous with the transmission clock ckw. When the transmission permit signal rwo takes the value H for one clock, the transmitter 101 sends one word of the transmission data dwi to the data transfer unit 103 synchronously with the transmission clock ckw. While the transmission permit signal rwo is taking the value L, the transmitter 101 will not send the transmission data dwi and transmission enable signal ewi.

The receiver 102 operates on the transmission clock ckw and asynchronous clock (reception clock ckr). The receiver 102 is supplied at a data input terminal thereof with data on a predetermined bus width. For data transfer, the receiver 102 receives reception data dro synchronous wit a reception clock ckr from the data transfer unit 103.

The receiver 102 outputs a reception enable signal eri indicating a reception timing of the reception data dro being transferred on the bus to the data transfer unit 103 synchronously with the reception clock ckr. The reception enable signal eri is represented by a binary signal taking either of two values: H (high) and L (low) synchronous with the reception clock ckr. The reception enable signal eri takes the value H when the reception data dro is being transferred from the data transfer unit 103 to the receiver 102, and the value L when the reception data dro is not being transferred so.

The receiver 102 receives a reception permit signal rro permitting to input the reception signal dro is permitted from the data transfer unit 103. The reception permit signal rro is represented by a binary signal taking either of two values: H (high) and L (low) synchronous with the reception clock ckr. During a period for which the reception permit signal rro takes the value H, the receiver 102 can receive one word of the reception data dro from the data transfer unit 103 synchronously with the reception clock ckr. While the reception permit signal rro is taking the value L, the receiver 102 will not receive the reception data dro and send the reception enable signal eri.

When the transmission enable signal ewi takes the value H, the data transfer unit 103 receives one word of transmission data dwi and latches the data internally. Also, when the reception enable signal eri takes the value H, the receiver 102 reads one word of data latched in the data transfer unit 103.

The data transfer unit 103 is supplied with the transmission enable signal ewi from the transmitter 101, and the reception enable signal eri from the receiver 102. Also, the data transfer unit 103 outputs the transmission permit signal rwo to the transmitter 101 and the reception permit signal rro to the receiver 102.

In the above clock swapping system 100, there are cyclically done operations (S1) to (S4) as will be described below. It should be noted that when the power is supplied or when data transfer is started upon reception of an instruction for starting the data transfer, the data transfer unit 103 supplies an H-level transmission permit signal rwo to the transmitter 101 and L-level reception permit signal rro to the receiver 102.

(S1) First, upon reception of the H-level transmission permit signal rwo from the data transfer unit 102, the transmitter 101 supplies one word of the transmission data dwi to the data transfer unit 103. At this time, the transmitter 101 sets the level of the transmission enable signal ewi to H for one clock (transmission clock ckw) synchronously with the transfer of the transmission data dwi.

(S2) Next, upon reception of the H-level transmission enable signal ewi from the transmitter 101, the data transfer unit 103 supplies an H-level transmission permit signal rwo to the transmitter 101 and H-level reception permit signal rwo to the receiver 102. It should be noted that at this time, the data transfer unit 103 will take a pause of more than one period of the transmission clock ckw between a time when the transmission enable signal ewi is set to H (at the leading edge of the transmission enable signal ewi, for example) and a time when the reception permit signal rro is set to H (at the leading edge of the reception permit signal rro, for example). This is intended for assuring that storage of the transmission data dwi from the transmitter 101 into the data transfer unit 103 will positively be completed.

(S3) Upon reception of the H-level reception permit signal rro from the data transfer unit 103, the receiver 102 reads one word of the reception data dro from the data transfer unit 103. At this time, the receiver 102 sets the reception enable signal eri to H for one clock (reception clock ckr) synchronously with the transfer of the reception data dro.

(S4) Next, upon reception of the H-level reception enable signal eri from the receiver 102, the data transfer unit 103 supplies an L-level reception permit signal rro to the receiver 102 and H-level transmission permit signal rwo to the transmitter 101. It should be noted that at this time, the data transfer unit 103 will take a pause of more than one period of the reception clock ckr between a time when the reception enable signal eri is set to H (at the leading edge of the reception enable signal eri, for example) and a time when the transmission permit signal rwo is set to H (at the leading edge of the transmission permit signal rwo, for example). This is intended for assuring that reading of the reception data dro by the receiver 102 from the data transfer unit 103 will positively be completed.

The data transfer unit 103 is internally constructed as will be described below:

As shown in FIG. 1, the data transfer unit 103 includes a data latch 111 and a timing control circuit 112.

The data latch 111 operates synchronously with the transmission clock ckw and latches one word of the transmission data dwi on the bus when the transmission enable signal ewi has the value H. Also, when the reception enable signal eri is set to H, data latched in the data latch 111 is read for one word by the receiver 102.

As shown in FIG. 2, the timing control circuit 112 includes first to fourth SR flip-flop (SR-FF) circuits 121 to 124, first and second D flip-flop (D-FF) circuits 125 and 126, first and second OR circuits 127 and 128, first and second inversion circuits 129 and 130, and first and second AND circuits 131 and 132.

The first SR-FF circuit 121 is supplied at a set terminal (set) thereof with transmission enable signal ewi from the transmitter 101, and at a reset terminal (rst) with output signal from the first D-FF circuit 125. The first SR-FF circuit 121 is supplied at a clock terminal thereof with the transmission clock ckw.

The second SR-FF circuit 122 is supplied at a set terminal (set) thereof with output signal from the first D-FF circuit 125, and at a reset terminal (rst) with output signal from the third SR-FF circuit 123. The second SR-FF circuit 122 is supplied at a clock terminal thereof with the reception clock ckr.

The third SR-FF circuit 123 is supplied at a set terminal (set) thereof with the reception enable signal eri from the receiver 102, and at a reset terminal (rst) with output signal from the second D-FF circuit 126. The third SR-FF circuit 123 is supplied at a clock terminal thereof with the reception clock ckr.

The fourth SR-FF circuit 124 is supplied at a set terminal (set) thereof with output signal ewi from the second D-FF circuit 126, and at a reset terminal (rst) with output signal from the first SR-FF circuit 121. The fourth SR-FF circuit 124 is supplied at a clock terminal thereof with the transmission clock ckw.

The first D-FF circuit 125 is supplied at an input terminal (d) thereof with output signal from the first SR-FF circuit 121, and at a clock terminal with the reception clock ckr.

The second D-FF circuit 126 is supplied at an input terminal (d) thereof with output signal from the third SR-FF circuit 123, and at a clock terminal with the transmission clock ckw.

The first OR circuit 127 is supplied at one input terminal thereof with output signal from the first D-FF circuit 125, and at the other input terminal with output signal from the second SR-FF circuit 122. The second OR circuit 128 is supplied at one input terminal thereof with output signal from the second D-FF circuit 126, and at the other terminal with output signal from the fourth SR-FF circuit 124.

The first inversion circuit 129 is supplied at an input terminal thereof with output signal from the third SR-FF circuit 123, and the second inversion circuit 130 is supplied at an input terminal thereof with output signal from the first SR-FF circuit 121.

The first AND circuit 131 is supplied at one input terminal thereof with output signal from the first inversion circuit 129, and at the other input terminal with output signal from the first OR circuit 127. The second AND circuit 132 is supplied at one input terminal thereof with output signal from the second inversion circuit 130, and at the other input terminal with output signal from the second OR circuit 128.

In the timing control circuit 112 connected as above, output signal from the first AND circuit 131 is supplied as reception permit signal rro to the receiver 102, and output signal from the second AND circuit 131 is supplied as transmission permit signal rwo to the transmitter 101.

FIGS. 3 and 4 are timing diagrams of various signals when the timing control circuit constructed as above is used in the clock swapping system. FIG. 3 is a timing diagram when ckw<ckr, and FIG. 4 is a timing diagram when ckw>ckr. It should be noted that in both FIGS. 3 and 4, the reference "A" indicates output signal from the first SR-FF circuit 121, "B" indicates output signal from the first D-FF circuit 125, "C" indicates output signal from the third SR-FF circuit 123, and "D" indicates output signal from the second D-FF circuit 126.

In the conventional clock swapping system 100 which controls data transfer with the data transmission and reception permit signals as above, operations are done by repeating a sequence from issue of transmission permit signal rwo, storage of transmission data dwi, issue of reception permit signal rro to reading of reception data dro.

Therefore, the conventional clock swapping system 100 permits data transfer between two systems acting with clocks asynchronous with each other without having to use any large-capacity FIFO, RAM, etc. and whatever the ratio between the transmission and reception clocks ckw and ckr is.

The first D-FF circuit 125 is put into action at the leading edge of the reception clock ckr. However, a signal latched by the first D-FF circuit 125 is a one having been latched by the first SR-FF circuit 121 at the leading edge of the transmission clock ckw. Therefore, the time from latching of the transmission enable signal ewi by the first SR-FF circuit 121 until a next reception clock ckr rises will possibly be extremely short. In case the latching interval is so short, a so-called "metastable" phenomenon will possibly take place, resulting in an unstable operation of a downstream latch circuit (first D-FF circuit 125). Also, the second D-FF circuit 126 may possibly incur such a "metastable" phenomenon.

OBJECT AND SUMMARY OF THE INVENTION

It is therefore an object of the present invention to overcome the above-mentioned drawbacks of the related art by providing a data transfer unit and method used in a clock swapping system which controls data transfer via permission of data transmission and reception to always permit stable data transfer by eliminating the influence of an internal metastable state, if any.

The above object can be attained by providing a data transfer unit used in a clock swapping system including a transmitter to send data synchronously with a first clock and a receiver to receive data synchronously with a second clock different from the first clock, the transmitter being supplied with a transmission permit signal, and sending, in response to the received transmission permit signal, a transmission enable signal indicating that the data is valid while sending the data synchronously with the transmission enable signal, and the receiver being supplied with a reception permit signal, and sending, in response to the reception permit signal, a reception enable signal indicating that the data is valid while receiving the data synchronously with the reception enable signal, the data transfer unit including according to the present invention:

a data latching means for latching the data sent from the transmitter in time with the reception enable signal and from which latched data is read by the receiver in time with the reception enable signal;

a first latching means for latching the transmission enable signal sent from the transmitter in time with the first clock and delaying the latched transmission enable signal for at least one period of the first clock;

a second latching means for latching the transmission enable signal latched by the first latching means in time with the second clock;

a reception permit signal generating means for sending a reception permit signal synchronous with the second clock in response to the transmission enable signal latched by the second latching means and suspending sending of the reception permit signal in response to the reception enable signal sent from the receiver;

a third latching means for latching the reception enable signal sent from the receiver in time with the second clock and delaying the latched reception enable signal for at least a period of the second clock;

a fourth latching means for latching the reception enable signal latched by the third latching means in time with the first clock; and a transmission permit signal generating means for sending a transmission permit signal synchronous with the first clock in response to the reception enable signal latched by the fourth latching means and suspending sending of the transmission permit signal in response to the transmission enable signal sent from the transmitter.

In the above data transfer unit according to the present invention, the second latching means latches the transmission enable signal latched by the first latching means a series of two or more times in time with the second clock, and the fourth latching means latches the transmission enable signal latched by the second latching means a series of two or more times in time with the first clock.

Also the above object can be attained by providing a data transfer method used in a clock swapping method including a transmission step of sending data synchronously with a first clock and a reception step of receiving data synchronously with a second clock different from the first clock; in the transmission step, there being supplied a transmission permit signal and sent signal, in response to the received transmission permit signal, a transmission enable signal indicating that the data is valid while there is sent the data synchronously with the transmission enable; and in the reception step, there being supplied a reception permit signal, and sent signal, in response to the reception permit signal, a reception enable signal indicating that the data is valid while there is received the data synchronously with the reception enable, the data transfer method including according to the present invention:

a data latching step of latching the data sent from the transmission step in time with the reception enable signal and in which latched data is read in the reception step in time with the reception enable signal;

a first latching step of latching the transmission enable signal sent from the transmission step in time with the first clock and delaying the latched transmission enable signal for at least one period of the first clock;

a second latching step of latching the transmission enable signal latched in the first latching step in time with the second clock;

a reception permit signal generating step of sending a reception permit signal synchronous with the second clock in response to the transmission enable signal latched in the second latching step and suspending sending of the reception permit signal in response to the reception enable signal sent from the reception step;

a third latching step of latching the reception enable signal sent from the reception step in time with the second clock and delaying the latched reception enable signal for at least a period of the second clock;

a fourth latching step of latching the reception enable signal latched in the third latching step in time with the first clock; and a transmission permit signal generating step of sending a transmission permit signal synchronous with the first clock in response to the reception enable signal latched in the fourth latching step and suspending sending of the transmission permit signal in response to the transmission enable signal sent from the transmission step.

In the above data transfer method according to the present invention, the transmission enable signal latched in the first latching step is latched a series of two or more times in the second latching step in time with the second clock, and the transmission enable signal latched in the second latching step is latched a series of two or more times in the fourth latching step in time with the first clock.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described concerning a clock swapping system to which it is applied. For transfer of data from one system operating on one clock to any other system operating on a clock asynchronous with the clock for the one system, the clock swapping system clock swaps the clock for the one system with that for the other system.

Figure 1:
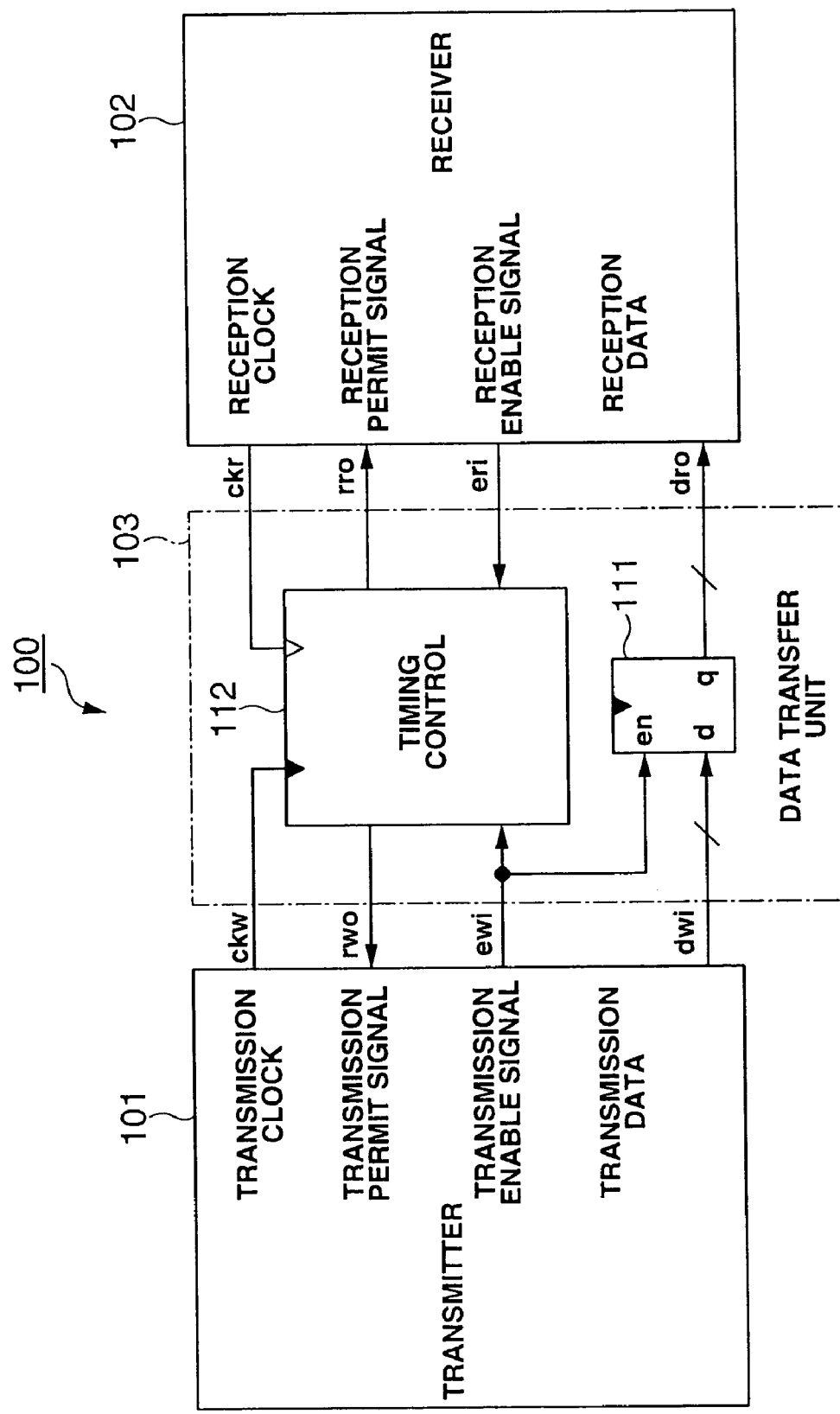
FIG. 1 is a block diagram of the conventional clock swapping system.
Figure 2:
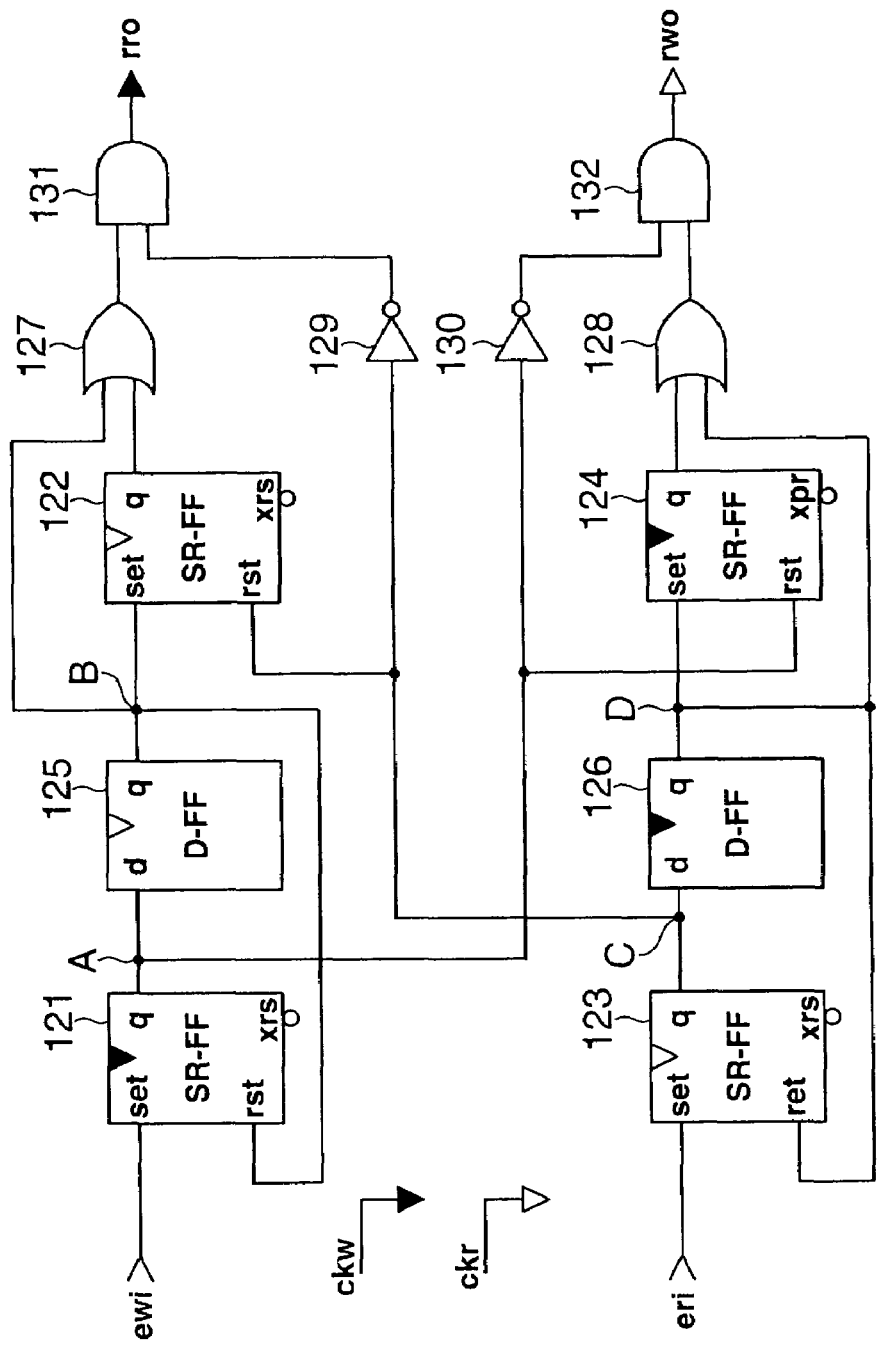
FIG. 2 is a circuit diagram of the data transfer unit used in the conventional clock swapping system.
Figure 3:
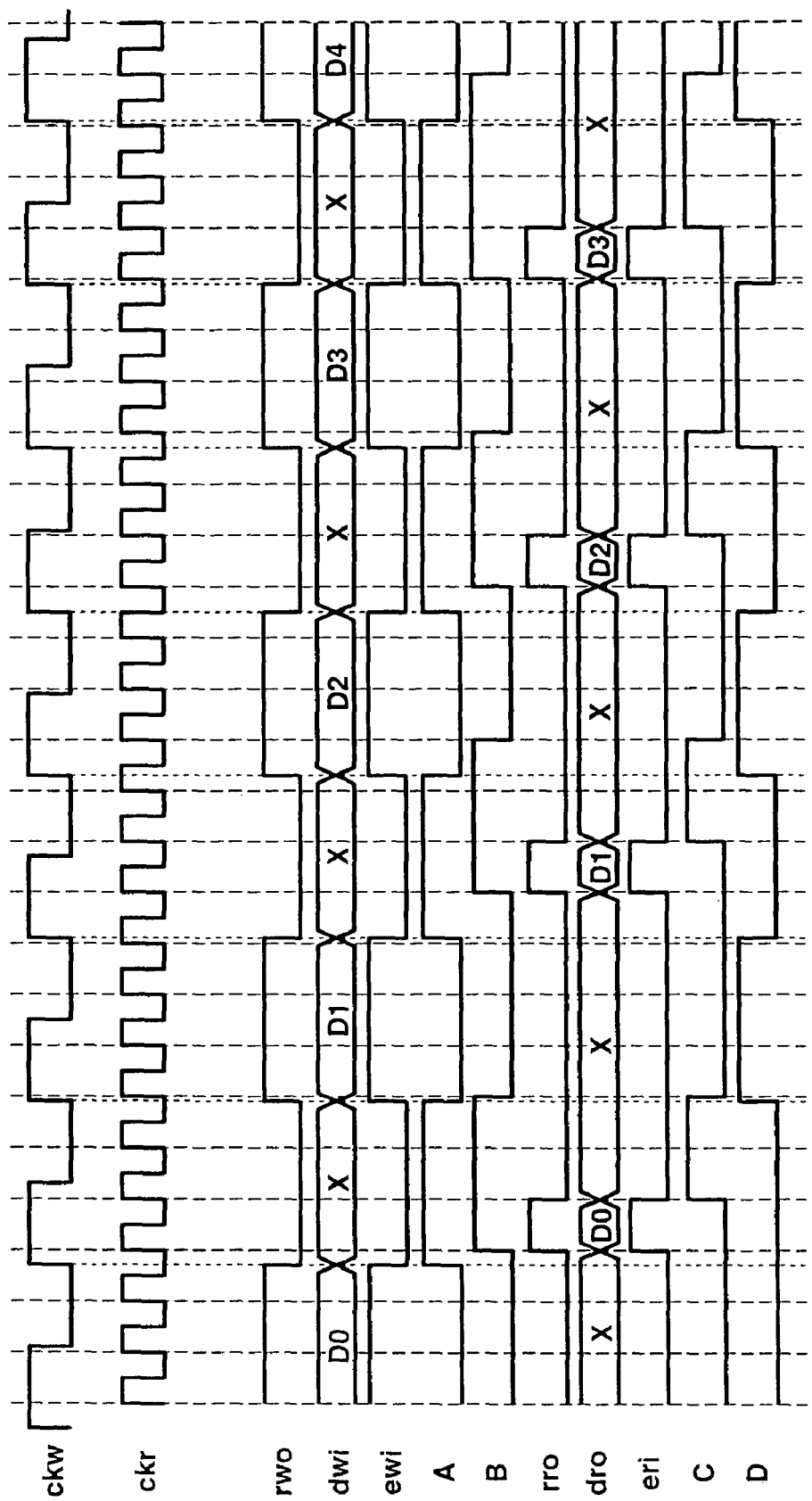
FIG. 3 is a timing diagram (when ckw<ckr) of the data transfer unit shown in FIG. 3.
Figure 4:
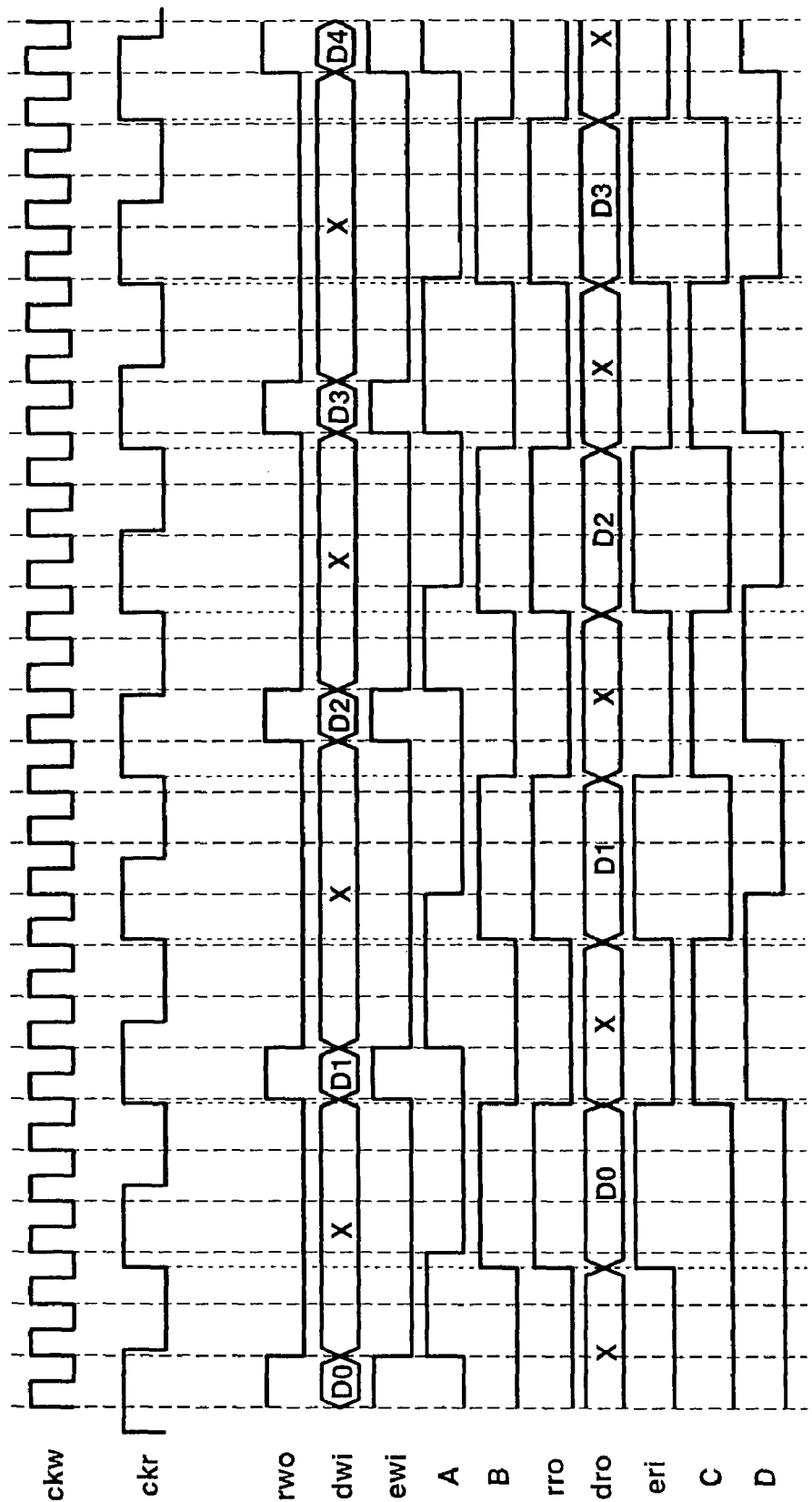
FIG. 4 is a timing diagram (when ckw>ckr) of the data transfer unit shown in FIG. 3.
Figure 5:
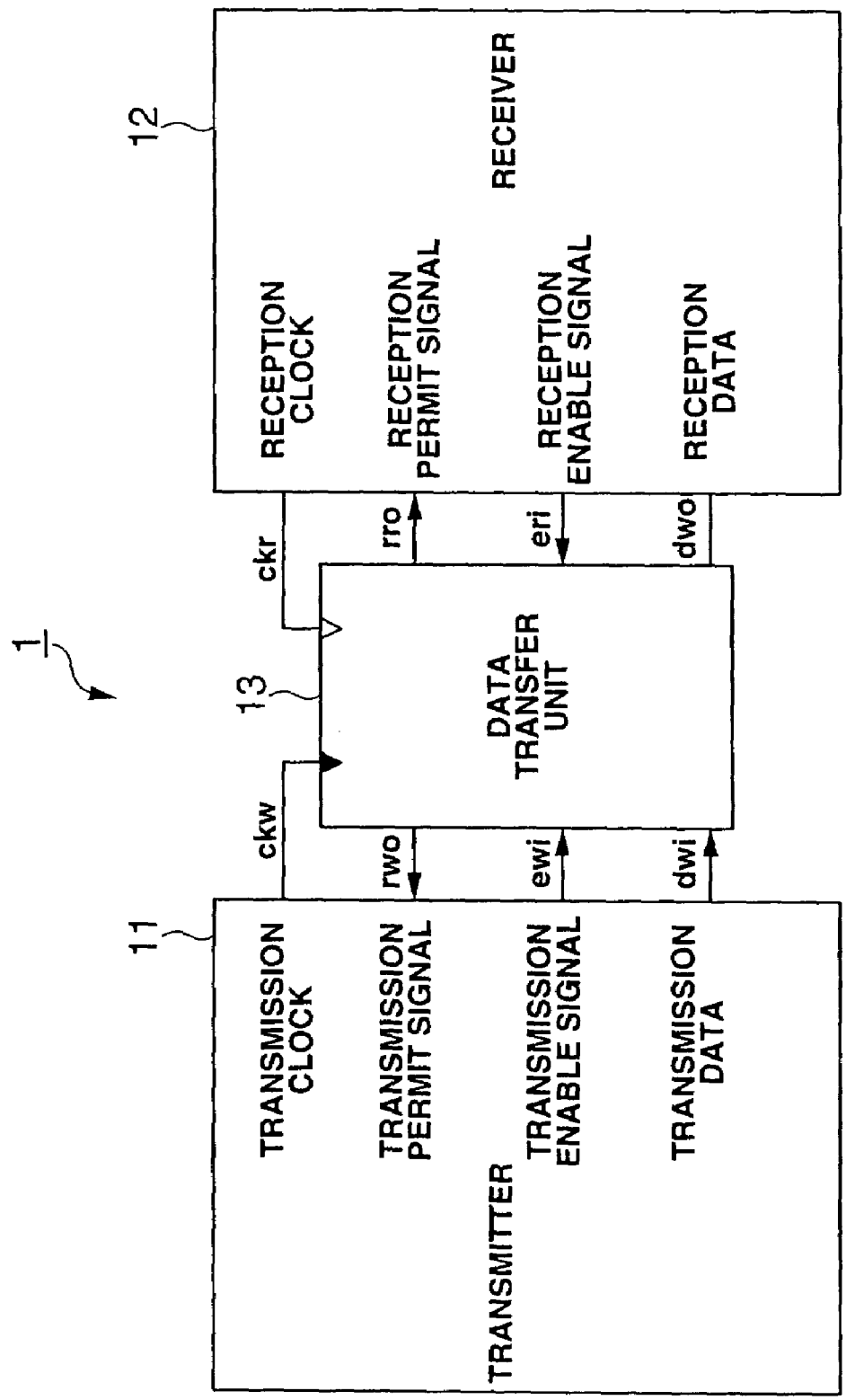
FIG. 5 is a block diagram of the clock swapping system according to the present invention.

Referring now to FIG. 5, there is schematically illustrated in the form of a block diagram the clock swapping system included in the present invention.

The clock swapping system, generally indicated with a reference 1, included in the present invention includes a data transmitter 11, data receiver 12 and a data transfer unit 13 provided between the transmitter 11 and receiver 12 to transfer data from the transmitter 11 to the receiver 12.

The transmitter 11 operates on a clock having a predetermined frequency. The clock on which the transmitter 11 operates will be referred to as "transmission clock ckw" hereunder. The transmitter 11 outputs data on a predetermined bus width at a data output terminal thereof. For data transfer, the transmitter 11 sends data synchronous with the transmission clock ckw to the data transfer unit 13. The data sent from the transmitter 11 to the data transfer unit 13 will be referred to as "transmission data dwi" hereunder.

For data transfer, the transmitter 11 outputs also a transmission enable signal ewi indicating a transmission timing of the transmission data dwi being transferred on a bus to the data transfer unit 13 synchronously with the transmission data dwi. The transmission enable signal ewi is represented by a binary signal taking either of values: H (high) and L (low) synchronous with the transmission clock ckw. The transmission enable signal ewi takes the value H when the transmission data dwi is being transferred from the transmitter 11 to the data transfer unit 13, and the value L when the transmission data dwi is not being transferred.

The transmitter 11 receives, from the data transfer unit 13, a transmission permit signal rwo permitting to output the transmission data dwi. The transmission permit signal rwo is represented by a binary signal having either of two values: H (high) and L (low) synchronous with the transmission clock ckw. When the transmission permit signal rwo takes the value H for one clock, the transmitter 11 sends one word of the transmission data dwi to the data transfer unit 13 synchronously with the transmission clock ckw. While the transmission permit signal rwo is taking the value L, the transmitter 11 will not send the transmission data dwi and transmission enable signal ewi.

The receiver 12 operates on a clock asynchronous with the transmission clock ckw. The clock on which the receiver 12 operates will be referred to as "reception clock ckr" hereunder. The receiver 12 is supplied at a data input terminal thereof with data on a predetermined bus width. For data transfer, the receiver 12 receives data synchronous with the reception clock ckr from the data transfer unit 13. The data transferred from the data transfer unit 13 will be referred to as "reception data dro" hereunder.

The receiver 12 outputs a reception enable signal eri indicating a reception timing of the reception data dro being transferred on the bus to the data transfer unit 13 synchronously with the reception clock ckr. The reception enable signal eri is represented by a binary signal taking either of two values: H (high) and L (low) synchronous with the reception clock ckr. The reception enable signal eri takes the value H when the reception data dro is being transferred from the data transfer unit 13 to the receiver 12, and the value L when the reception data dro is not being transferred so.

The receiver 12 receives, from the data transfer unit 13, a reception permit signal rro permitting to input the reception signal dro. The reception permit signal rro is represented by a binary signal taking either of two values: H (high) and L (low) synchronous with the reception clock ckr. When the reception permit signal rro takes the value H for one clock, the receiver 12 receives one word of the reception data dro from the data transfer unit 13 synchronously with the reception clock ckr. While the reception permit signal rro is taking the value L, the receiver 12 will not receive the reception data dro and send the reception enable signal eri.

When the transmission enable signal ewi takes the value H, the data transfer unit 13 receives one word of transmission data dwi from the transmitter 11 and latches the data internally. Also, when the reception enable signal eri takes the value H, the receiver 12 reads one word of data latched in the data transfer unit 13.

The data transfer unit 13 is supplied with the transmission enable signal ewi from the transmitter 11, and the reception enable signal eri from the receiver 12. Also, the data transfer unit 13 outputs the transmission permit signal rwo to the transmitter 11 and the reception permit signal rro to the receiver 12.

In the above clock swapping system 1, there are cyclically done operations (S11) to (S14) as will be described below. It should be noted that when the power is supplied or when data transfer is started upon reception of an instruction for starting the data transfer, the data transfer unit 13 supplies an H-level transmission permit signal rwo to the transmitter 11 and L-level reception permit signal rro to the receiver 12.

(S11) First, upon reception of the H-level transmission permit signal rwo from the data transfer unit 13, the transmitter 11 supplies one word of the transmission data dwi to the data transfer unit 13. At this time, the transmitter 11 sets the level of the transmission enable signal ewi to H for one clock (transmission clock ckw) synchronously with the transfer of the transmission data dwi.

(S12) Next, upon reception of the H-level transmission enable signal ewi from the transmitter 11, the data transfer unit 13 supplies an L-level transmission permit signal rwo to the transmitter 11 and H-level reception permit signal rro to the receiver 12. It should be noted that at this time, the data transfer unit 13 will take a pause of more than two periods of the transmission clock ckw between a time when the transmission enable signal ewi is set to H (at the leading edge of the transmission enable signal ewi, for example) and a time when the reception permit signal rro is set to H (at the leading edge of the reception permit signal rro, for example). This is intended for assuring that storage of the transmission data dwi from the transmitter 11 into the data transfer unit 103 will positively be completed and also assuring a stable outputting even if the "metastable" phenomenon takes place during clock switching from the transmission clock ckw to reception clock ckr.

(S13) Upon reception of the H-level reception permit signal rro from the data transfer unit 13, the receiver 12 reads one word of the reception data dro from the data transfer unit 13. At this time, the receiver 12 sets the reception enable signal eri to H for one clock (reception clock ckr) synchronously with the transfer of the reception data dro.

(S14) Next, upon reception of the H-level reception enable signal eri from the receiver 12, the data transfer unit 13 supplies an L-level reception permit signal rro to the receiver 12 and H-level transmission permit signal rwo to the transmitter 11. It should be noted that at this time, the data transfer unit 13 will take a pause of more than one period of the reception clock ckr between a time when the reception enable signal eri is set to H (at the leading edge of the reception enable signal eri, for example) and a time when the transmission permit signal rwo is set to H (at the leading edge of the transmission permit signal rwo, for example). This is intended for assuring that reading of the reception data dro by the receiver 12 from the data transfer unit 13 will positively be completed and also assuring a stable outputting even if the "metastable" phenomenon takes place during clock switching from the transmission clock ckw to reception clock ckr.

Figure 6:
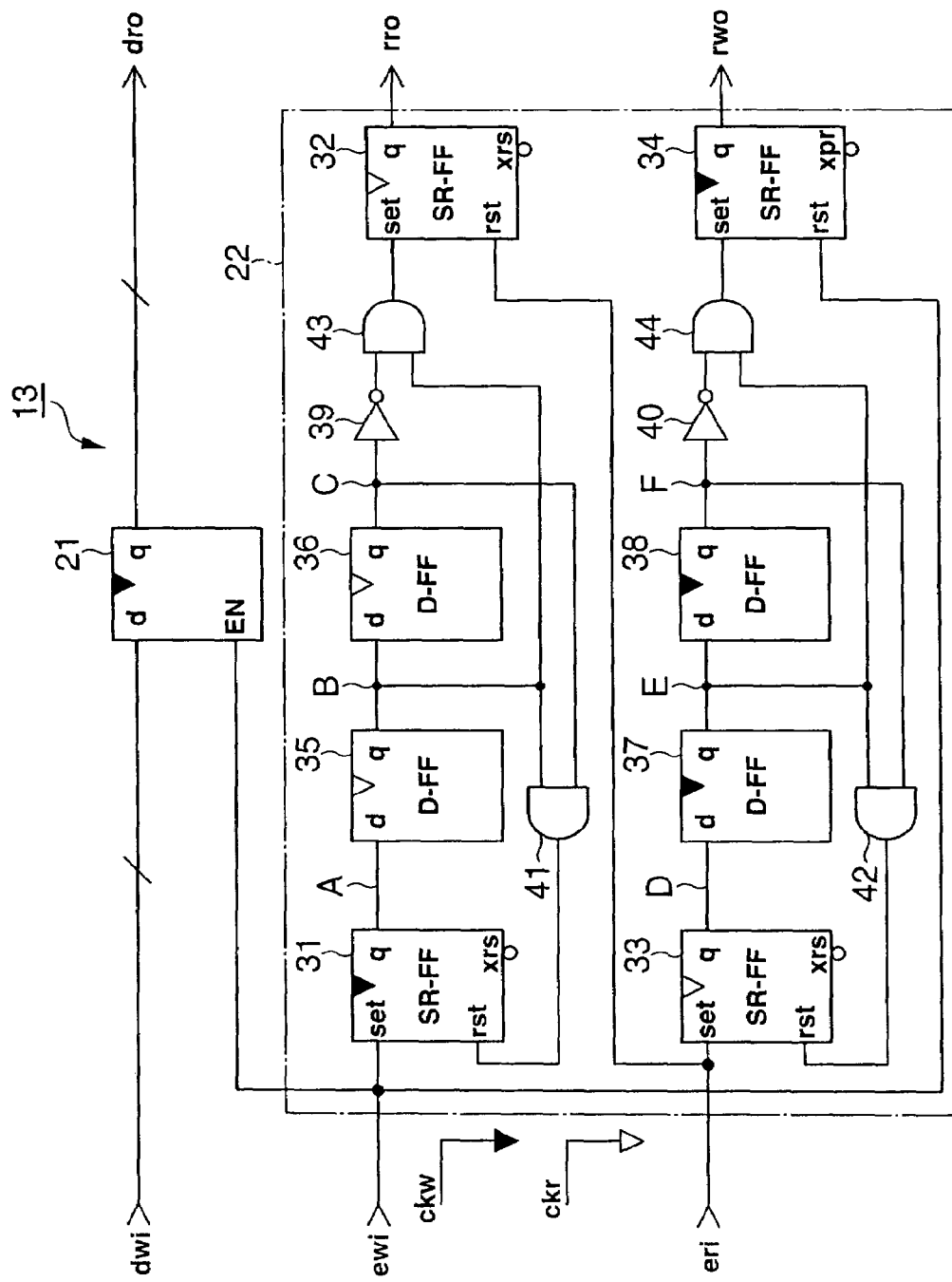
FIG. 6 is a circuit diagram of a data transfer unit used in the clock swapping system shown in FIG. 5.

The data transfer unit 13 is internally constructed as will be described below with reference to FIG. 6:

As shown in FIG. 6, the data transfer unit 13 includes a data latch 21 and a timing control circuit 22.

The data latch 21 is a latch circuit provided with a clock input terminal and which operates synchronously with the leading edge of a signal supplied to the clock input terminal. The data latch 21 is supplied at the clock input terminal thereof with the transmission clock ckw. The data latch 21 is provided with an input terminal (d), enable terminal (en) and an output terminal (q). The data latch 21 is supplied at the input terminal (d) thereof with transmission data from the transmitter 11, and at the enable terminal (en) with the transmission enable signal ewi from the transmitter 11. The data latch 21 latches one word of the transmission data dwi on the bus when the transmission enable signal ewi has the value H. Also, the data latch 21 is connected at the output terminal (q) thereof to the data input terminal of the receiver 12. When the reception enable signal eri is set to H, data latched in the data latch 21 is read for one word by the receiver 12.

The timing control circuit 22 includes first to fourth SR flip-flop (SR-FF) circuits 31 to 34, first to fourth D flip-flop (D-FF) circuits 35 to 38, first and second inversion circuits 39 and 40 and first to fourth AND circuits 41 to 44.

Each of the first to fourth SR-FF circuits 31 to 34 is provided with a clock input terminal and operates synchronously with the input timing of a signal (at the leading edge, for example) supplied to the clock input terminal. That is, each of the first to fourth SR-FF circuits 31 to 34 is provided with a set terminal (set), reset terminal (rst) and an output terminal (q). In the first to fourth SR-FF circuits 31 to 34, an internal state thereof in which the set terminal (set) has the value H is taken as being of the value H and is maintained until the reset terminal (rst) takes the value H. When the reset terminal (rst) takes the value H, the internal state of the first to fourth SR-FF circuits 31 to 34 is reset to the value L. The internal state of the first to fourth SR-FF circuits 31 to 34 is detected at the output terminal (q).

Also, each of the SR-FF circuits 31 to 34 is provided with initialize terminals (xrs and spr). When the initialize terminal (xrs) takes the value H, the internal state of the first to third SR-FF circuits 31 to 34 is forcibly set to L. When the initialize terminal (spr) takes the value H, the internal state of the fourth SR-FF circuit 34 is forcibly set to H.

Each of the first to fourth D-FF circuits 35 to 38 is provided with a clock input terminal and operates synchronously with the input timing of a signal (at the leading edge, for example) supplied to the clock input terminal. That is, each of the first to fourth D-FF circuits 35 to 38 is provided with an input terminal (d) and an output terminal (q). Each of the first to fourth D-FF circuits 35 to 38 latches a value, H or L, supplied to the input terminal (d) for a period of one clock. The internal state of the first to fourth D-FF circuits 35 to 38 is detected at the output terminal (q).

Each of the first and second inversion circuits 39 to 40 is provided with one input terminal and one output terminal. It inverts a values, H or L, supplied to the input terminal thereof and delivers the inverted value at the output terminal thereof.

Each of the first to fourth AND circuits 41 to 44 is provided with two input terminals and one output terminal, and ANDs two values, H or L, supplied at the two input terminals thereof and delivers the result at the output terminal.

In the timing control circuit 22, the following circuits are connected as will be described below:

The first SR-FF circuit 31 is supplied at a set terminal (set) thereof with the transmission enable signal ewi from the transmitter 11, and at a reset terminal (rst) with output signal from the first AND circuit 41. The first SR-FF circuit 31 is supplied at a clock terminal thereof with the transmission clock ckw.

The first D-FF circuit 35 is supplied at an input terminal (d) thereof with output signal from the first SR-FF circuit 31, and at a clock terminal with the reception clock ckr.

The second D-FF circuit 36 is supplied at an input terminal (d) thereof with output signal from the first D-FF circuit 35, and at a clock terminal with the reception clock ckr.

The second SR-FF circuit 32 is supplied at a set terminal (set) thereof with output signal from the third AND circuit 42, and at a reset terminal (rst) with the reception enable signal eri. The second SR-FF circuit 32 is supplied at a clock terminal thereof with the reception clock ckr.

The third SR-FF circuit 33 is supplied at a set terminal (set) thereof with the reception enable signal eri from the receiver 12, and at a reset terminal (rst) with output signal from the second AND circuit 42. The third SR-FF circuit 33 is supplied at a clock terminal thereof with the reception clock ckr.

The third D-FF circuit 37 is supplied at an input terminal (d) thereof with output signal from the third SR-FF circuit 33, and at a clock terminal with the transmission clock ckw.

The fourth D-FF circuit 38 is supplied at an input terminal (d) thereof with output signal from the third D-FF circuit 37, and at a clock terminal with the transmission clock ckw.

The fourth SR-FF circuit 34 is supplied at a set terminal (set) thereof with output signal ewi from the fourth AND circuit 44, and at a reset terminal (rst) with the transmission enable signal ewi. The fourth SR-FF circuit 34 is supplied at a clock terminal thereof with the transmission clock ckw.

The first inversion circuit 39 is supplied at an input terminal thereof with output signal from the second D-FF circuit 36.

The second inversion circuit 40 is supplied at an input terminal thereof with output signal from the fourth D-FF circuit 38.

The first AND circuit 41 is supplied at one input terminal thereof with output signal from the first D-FF circuit 35, and at the other input terminal with output signal from the second D-FF circuit 36.

The second AND circuit 42 is supplied at one input terminal thereof with output signal from the third D-FF circuit 37, and at the other input terminal with output signal from the fourth D-FF circuit 38.

The third AND circuit 43 is supplied at one input terminal thereof with output signal from the first inversion circuit 39, and at the other input terminal with output signal from the first D-FF circuit 35.

The fourth AND circuit 44 is supplied at one input terminal thereof with output signal from the second inversion circuit 40, and at the other input terminal with output signal from the third D-FF circuit 37.

In the timing control circuit 22 connected as above, output signal from the second SR-FF circuit 32 is supplied as reception permit signal rro to the receiver 12, and output signal from the fourth SR-FF circuit is supplied as transmission permit signal rwo to the transmitter 11.

Figure 7:
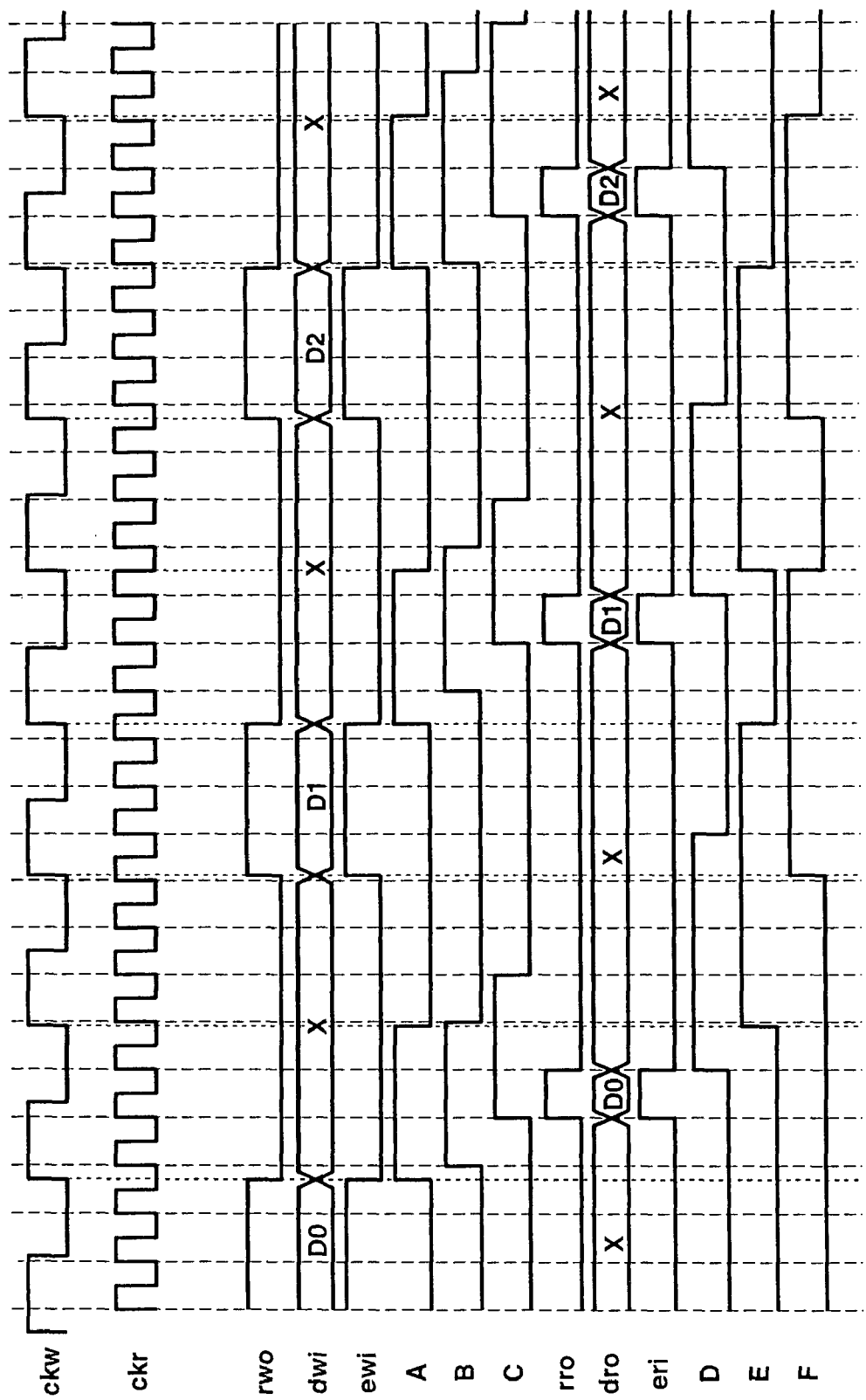
FIG. 7 is a timing diagram (when ckw<ckr) of the data transfer unit shown in FIG. 6.
Figure 8:
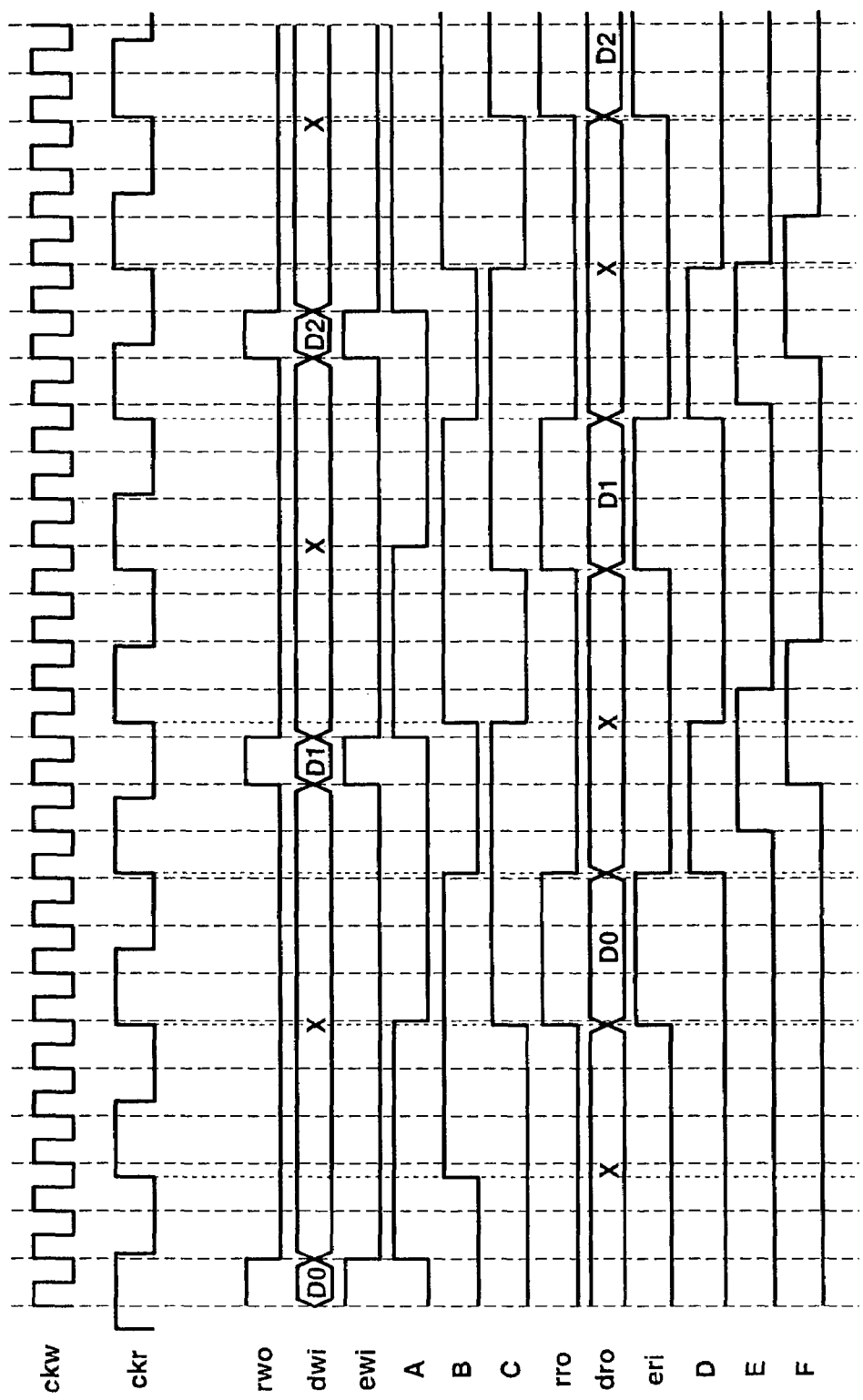
FIG. 8 is a timing diagram (when ckw>ckr) of the data transfer unit shown in FIG. 6.

FIGS. 7 and 8 are timing diagrams of various signals in the timing control circuit 22 constructed as above. FIG. 7 is a timing diagram when ckw<ckr, and FIG. 8 is a timing diagram when ckw>ckr. It should be noted that in both FIGS. 7 and 8, the reference "A" indicates output signal from the first SR-FF circuit 31, "B" indicates output signal from the first D-FF circuit 35, "C" indicates output signal from the second D-FF circuit 36, "D" indicates output signal from the third SR-FF circuit 33, "E" indicates output signal from the third D-FF circuit 37, and "F" indicates output signal from the fourth D-FF circuit 38.

The first D-FF circuit 35 is put into action at the leading edge of the reception clock ckr. However, a signal latched by the first D-FF circuit 35 is a one having been latched by the first SR-FF circuit 31 at the leading edge of the transmission clock ckw. Therefore, the time from latching of the transmission enable signal ewi by the first SR-FF circuit 31 until a next reception clock ckr rises will possibly be extremely short. In case the latching interval is so short, a so-called "metastable" phenomenon will possibly take place, resulting in an unstable operation of the first D-FF circuit 35. Also, the third D-FF circuit 37 may possibly incur such a "metastable" phenomenon.

In the timing control circuit 22, however, there is provided downstream of the first D-FF circuit 35 the second D-FF circuit 36 which is put into action at the leading edge of the reception clock ckr and the reception permit signal rro is generated based on the signal latched by the second D-FF circuit 36. Similarly, there is also provided downstream of the third D-FF circuit 37 the fourth D-FF circuit 38 which is put into action at the leading edge of the transmission clock ckw and the transmission permit signal rwo is generated based on the signal latched by the fourth D-FF circuit 38.

Therefore, in the timing control circuit 22, even if the metastable phenomenon takes place in the first and third D-FF circuits 35 and 37 which will thus be caused not to operate stably, the second and fourth D-FF circuits 36 and 38 provided downstream of the first and third D-FF circuits 35 and 37, respectively, will eliminate the influence of the metastable phenomenon, whereby it is made possible to always output a stable control signal.

In the clock swapping system 1 having been described in the foregoing, operations will be done by repeating a sequence from issue of transmission permit signal rwo, storage of transmission data dwi, issue of reception permit signal rro to reading of transmission data dro. The clock swapping system 1 permits data transfer between two systems acting with clocks asynchronous with each other without having to use any large-capacity FIFO, RAM, etc. and whatever the ratio between the transmission and reception clocks ckw and ckr is.

Further, in the clock swapping system 1 included in the present invention, when the transmission enable signal ewi synchronous with the transmission clock ckw is received, it is recognized that the transmission data dwi has been stored and the reception permit signal rro synchronous with the reception clock ckr is issued. When the reception enable signal eri synchronous with the reception clock ckr is received, it is recognized that the reception data dro has been read and the transmission permit signal rwo synchronous with the transmission clock ckw is issued. At this time, in the clock swapping system 1, the transmission enable signal ewi is latched a series of two or more times in time with the reception clock ckr and thereafter the reception permit signal rro is issued. Also, in the clock swapping system 1, the reception enable signal eri is latched a series of two or more times in time with the transmission clock ckw and thereafter the transmission permit signal rwo is issued.

Therefore, in the clock swapping system 1 included in the present invention, even if a metastable phenomenon takes place in a latch circuit at the boundary between the transmission clock ckw and reception clock ckr, the influence of the metastable phenomenon can be eliminated to always assure stable data transfer.

The data transfer unit according to the present invention is used in a system in which the transmitter is permitted by the data transfer unit to send data and sends one word of data to the data transfer unit, and the receiver is permitted by the data transfer unit to receive the data and receives one word of data from the data transfer unit.

In the data transfer unit according to the present invention, in case the signal latched in time of the first clock as an operating clock for the transmitter is latched in time of the second clock as an operating clock for the receiver, it is latched a series of at least two times in time with the second clock. Similarly, the signal latched in time with the second clock is subsequently latched in time with the first clock, it is latched a series of at least two times in time of the first clock.

In the data transfer unit according to the present invention, even if a metastable phenomenon internally takes place when the signal latched in time with the first clock is latched continuously in time of the second clock or when the signal latched in time of the second clock is latched continuously in time of the first clock, the influence of the metastable phenomenon can be eliminated to always assure stable data transfer.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. A data transfer unit used in a clock swapping system including a transmitter to send data synchronously with a first clock and a receiver to receive data synchronously with a second clock different from the first clock, the transmitter being supplied with a transmission permit signal, and sending, in response to the received transmission permit signal, a transmission enable signal indicating that the data is valid while sending the data synchronously with the transmission enable signal, and the receiver being supplied with a reception permit signal, and sending, in response to the reception permit signal, a reception enable signal indicating that the data is valid while receiving the data synchronously with the reception enable signal, the data transfer unit comprising:

a data latching means for latching the data sent from the transmitter in time with the reception enable signal and from which latched data is read by the receiver in time with the reception enable signal;

a first latching means for latching the transmission enable signal sent from the transmitter in time with the first clock and delaying the latched transmission enable signal for at least one period of the first clock;

a second latching means for latching the transmission enable signal latched by the first latching means in time with the second clock;

a reception permit signal generating means for sending a reception permit signal synchronous with the second clock in response to the transmission enable signal latched by the second latching means and suspending sending of the reception permit signal in response to the reception enable signal sent from the receiver;

a third latching means for latching the reception enable signal sent from the receiver in time with the second clock and delaying the latched reception enable signal for at least a period of the second clock;

a fourth latching means for latching the reception enable signal latched by the third latching means in time with the first clock; and a transmission permit signal generating means for sending a transmission permit signal synchronous with the first clock in response to the reception enable signal latched by the fourth latching means and suspending sending of the transmission permit signal in response to the transmission enable signal sent from the transmitter.

2. The apparatus as set forth in claim 1, wherein the second latching means latches the transmission enable signal latched by the first latching means a series of two or more times in time with the second clock; and the fourth latching means latches the transmission enable signal latched by the second latching means a series of two or more times in time with the first clock.

3. A data transfer method used in a clock swapping method including a transmission step of sending data synchronously with a first clock and a reception step of receiving data synchronously with a second clock different from the first clock; in the transmission step, there being supplied a transmission permit signal and sent signal, in response to the received transmission permit signal, a transmission enable signal indicating that the data is valid while there is sent the data synchronously with the transmission enable; and in the reception step, there being supplied a reception permit signal, and sent signal, in response to the reception permit signal, a reception enable signal indicating that the data is valid while there is received the data synchronously with the reception enable, the data transfer method comprising:

a data latching step of latching the data sent from the transmission step in time with the reception enable signal and in which latched data is read in the reception step in time with the reception enable signal;

a first latching step of latching the transmission enable signal sent from the transmission step in time with the first clock and delaying the latched transmission enable signal for at least one period of the first clock;

a second latching step of latching the transmission enable signal latched in the first latching step in time with the second clock;

a reception permit signal generating step of sending a reception permit signal synchronous with the second clock in response to the transmission enable signal latched in the second latching step and suspending sending of the reception permit signal in response to the reception enable signal sent from the reception step;

a third latching step of latching the reception enable signal sent from the reception step in time with the second clock and delaying the latched reception enable signal for at least a period of the second clock;

a fourth latching step of latching the reception enable signal latched in the third latching step in time with the first clock; and a transmission permit signal generating step of sending a transmission permit signal synchronous with the first clock in response to the reception enable signal latched in the fourth latching step and suspending sending of the transmission permit signal in response to the transmission enable signal sent from the transmission step.

4. The method as set forth in claim 3, wherein the transmission enable signal latched in the first latching step is latched a series of two or more times in the second latching step in time with the second clock; and the transmission enable signal latched in the second latching step is latched a series of two or more times in the fourth latching step in time with the first clock.

* * * * *